(12) United States Patent
Sadato

(10) Patent No.: US 11,672,292 B2
(45) Date of Patent: Jun. 13, 2023

(54) FLAME RESISTANT COMPOSITE ARTICLES AND METHODS

(71) Applicant: W. L. Gore & Associates G.K., Tokyo (JP)

(72) Inventor: Hiroki Sadato, Tokyo (JP)

(73) Assignee: W. L. Gore & Associates G.K., Tokyo (JP)

( * ) Notice: Subject to any disclaimer, the term of this patent is extended or adjusted under 35 U.S.C. 154(b) by 55 days.

(21) Appl. No.: 16/621,160

(22) PCT Filed: Jun. 29, 2018

(86) PCT No.: PCT/IB2018/054862
§ 371 (c)(1),
(2) Date: Dec. 10, 2019

(87) PCT Pub. No.: WO2019/003205
PCT Pub. Date: Jan. 3, 2019

(65) Prior Publication Data
US 2020/0187578 A1 Jun. 18, 2020

Related U.S. Application Data

(60) Provisional application No. 62/526,974, filed on Jun. 29, 2017.

(51) Int. Cl.
*A41D 31/08* (2019.01)
*B32B 5/02* (2006.01)
(Continued)

(52) U.S. Cl.
CPC ............ *A41D 31/085* (2019.02); *B32B 5/024* (2013.01); *B32B 5/026* (2013.01); *B32B 5/26* (2013.01); *B32B 7/12* (2013.01); *B32B 2255/02* (2013.01); *B32B 2255/26* (2013.01); *B32B 2262/0261* (2013.01); *B32B 2307/3065* (2013.01); *B32B 2307/7265* (2013.01); *B32B 2437/00* (2013.01)

(58) Field of Classification Search
CPC ...... A41D 31/085; B32B 5/024; B32B 5/026; B32B 5/26; B32B 2307/3065; B32B 2437/00
See application file for complete search history.

(56) References Cited

U.S. PATENT DOCUMENTS 8,156,576 B1 4/2012 Terrell
8,359,675 B2 1/2013 Terrell
(Continued)

FOREIGN PATENT DOCUMENTS

CN 101902929 A 12/2010
WO WO-2009/055047 A 4/2009

OTHER PUBLICATIONS

International Search Report and Written Opinion for International Application No. PCT/IB2018/054862 dated Oct. 24, 2018.

*Primary Examiner* — Joanna Pleszczynska
(74) *Attorney, Agent, or Firm* — Greenberg Traurig, LLP

(57) ABSTRACT

Described are flame resistant composite articles and methods for making and using. A flame resistant composite article is described comprising a facial layer, a meltable layer, a heat reactive material, and an inner layer that provide lightweight flame resistance and can accommodate printing and a large number of appearance options.

18 Claims, 7 Drawing Sheets

(51) Int. Cl.
*B32B 5/26* (2006.01)
*B32B 37/12* (2006.01)
*B32B 37/16* (2006.01)
*B32B 7/12* (2006.01)

(56) References Cited

U.S. PATENT DOCUMENTS

| | | |
|---|---|---|
| RE46,443 E | 6/2017 | Terrell |
| 2005/0287894 A1* | 12/2005 | Burns .................. A47C 31/001 |
| | | 442/136 |
| 2007/0026752 A1* | 2/2007 | Thiriot ................. A41D 31/085 |
| | | 442/217 |
| 2007/0264893 A1 | 11/2007 | Mikaelian |
| 2009/0110919 A1 | 4/2009 | Panse |
| 2011/0076494 A1* | 3/2011 | Gunzel ..................... B32B 3/28 |
| | | 428/355 R |
| 2016/0129668 A1 | 5/2016 | Kurian |

* cited by examiner

FLAME RESISTANT COMPOSITE ARTICLES AND METHODS

RELATED APPLICATIONS

The present application is a national phase filing under 35 USC 371 of International Application No. PCT/IB2018/054862, filed on Jun. 29, 2018, claiming priority to U.S. Provisional Application No. 62/526,974, filed on Jun. 29, 2017, the entire contents and disclosures of which are hereby incorporated by reference.

PRIORITY CLAIM

This patent application claims priority from U.S. Provisional App No. 62/526,974, filed Jun. 29, 2017, the disclosure of which is incorporated herein by reference in its entirety.

TECHNICAL FIELD

This disclosure relates to composite articles for garments that exhibit both good flame resistance and low flammability while maintaining the appearance, weight, feel, and robustness of traditional garments.

BACKGROUND OF THE DISCLOSURE

Protective garments for professionals working in hazardous environments where infrequent and short duration exposure to fire and extreme heat is possible, such as search and rescue, military and police personnel, are desirable to reduce burn injuries. Protective gear for workers exposed to these conditions should provide some enhanced protection compared with conventional technical garments to allow the wearer to get away from the hazard quickly and safely, rather than to combat the hazard. However, given that the fire and extreme heat exposure is expected to be only occasional, the weight and usability of the garment should be similar to those of conventional garments. Similarly, the weight, appearance and feel of the garment should be similar to conventional garments with the option to use all types of colors and patterns.

Traditionally, flame resistant protective garments have been made with an outermost layer comprising non-combustible, non-melting fabric made of, for example, aramids, polybenzimidazole (PBI), poly p-phenylene-2,6-benzobisoxazole (PBO), modacrylic blends, polyamines, carbon, polyacrylonitrile (PAN), and blends and combinations thereof. These fibers may be inherently flame resistant but may have several limitations. Specifically, these fibers may be very expensive, difficult to dye and print, and may not have adequate abrasion resistance. Additionally, these fibers pick up more water and offer unsatisfactory tactile comfort as compared to nylon or polyester based fabrics.

The cost of waterproof, flame resistant, protective clothing has been an important consideration for the large number of hazardous exposure applications outside fire protection, thereby precluding the use of typical, inherently flame resistant textiles such as those used in fire fighting community.

US Pub. No. 2009/0246485 describes a method for reducing the afterflame of a flammable, meltable material. A textile composite is described comprising an outer textile comprising a flammable, meltable material, and a heat reactive material adjacent to the outermost textile comprising a polymer resin-expandable graphite mixture.

US Pub. No. 2013/0004747 describes an article comprising a textile made of fibers/filaments having a partially internal discontinuous pattern of an impregnating material which penetrates the textile. The non-impregnated areas are air permeable and the textile is water vapor permeable and has reduced water absorption and re-dry time.

For optimum user performance in environments with occasional fire exposure, a lightweight, waterproof, or water resistant garment with enhanced burn protection is desired. Although solutions not involving inherently flame resistant textiles have been proposed, such as layered materials containing expandable graphite, improvements to aesthetics and production costs are still needed.

SUMMARY OF THE DISCLOSURE

The present disclosure relates to flame resistant composite articles. In a first, embodiment there is provided a flame resistant composite article comprising a facial layer; a meltable layer; a heat reactive material comprising a polymer resin and a graphite; and an inner layer, wherein the facial layer is attached to the meltable layer and the heat reactive material is disposed between the meltable layer and the inner layer.

The disclosure also relates to the first embodiment wherein the combination of the meltable layer and the heat reactive material form a char when exposed to flame. In one embodiment a char comprises a carbonaceous layer that forms after the meltable layer and the polymer materials of the heat reactive materials have been burned. The carbonaceous char has a very high melt point and provides insulation for those materials beneath the char.

The disclosure also relates to any one of the previous embodiments, wherein the combination of the facial layer, the meltable layer and the heat reactive material form a char when exposed to flame. In this embodiment the char comprises a carbonaceous layer formed after the meltable layer and the polymer materials of the heat reactive material and the facial layer have been burned. The carbonaceous char has a very high melt point and provides insulation for those materials beneath the char.

The disclosure also relates to any one of the previous embodiments, wherein the meltable layer is a woven, a knit, a tricot knit, a non-woven material, a multilayer non-woven material or combinations thereof.

The disclosure also relates to any one of the previous embodiments, wherein the meltable layer is a polyamide or polyester.

The disclosure also relates to any one of the previous embodiments, wherein the meltable layer is a meltable film wherein the meltable film can be a microporous or a nonporous film. In some embodiments, the nonporous film can provide for protection against chemical or biological exposure. The meltable film can be a non-porous and gas impermeable film and may be a meltable continuous film that covers, for example, all or part of an article or garment. In some embodiments, the meltable continuous film does not allow chemicals or biological materials to penetrate from the surface of the composite article to the wearer. In one embodiment, the meltable film is a single film layer. In another embodiment, the meltable film is a multilayer film. In one embodiment of the flame resistant composite article, the meltable film is a microporous polyolefin, a microporous polyester, or a microporous polyurethane.

In other embodiments, the meltable film is polyolefin, polyethylene, polypropylene, ethyl vinyl alcohol (EVOH), ethyl vinyl acetate (EVAc), polyvinyl chloride (PVC), polyvinylidene chloride (PVdC), polyvinyl fluoride, polyvinylidene fluoride, fluoropolymers, polyurethane, polyesters, polyamides, polyethers, polyacrylates and polymethacrylates, copolyetheresters, or copolymers or multilayer laminates thereof.

The disclosure also relates to any one of the previous embodiments, wherein the facial layer is a textile and the textile is a woven, a knit, a tricot knit, a non-woven material, a multilayer non-woven material or a combination thereof.

The disclosure also relates to any one of the previous embodiments, wherein the facial layer is a woven twill textile or a woven ripstop textile.

The disclosure also relates to any one of the previous embodiments, wherein the facial layer is polyamide, polyester, polypropylene, polyethylene or multilayer laminates thereof.

The disclosure also relates to any one of the previous embodiments, wherein the facial layer has a weight of less than 150 grams per square meter ($g/m^2$), less than 70 $g/m^2$, or less than 40 $g/m^2$.

The disclosure also relates to any one of the previous embodiments, wherein the meltable layer has a weight of less than 50 $g/m^2$, e.g., less than 40 $g/m^2$, less than 30 $g/m^2$, or less than 25 $g/m^2$.

The disclosure also relates to any one of the previous embodiments, wherein the inner layer comprises a thermally stable convective barrier.

The disclosure also relates to any one of the previous embodiments, wherein the inner layer comprises expanded polytetrafluoroethylene (ePTFE).

The disclosure also relates to any one of the previous embodiments, wherein the flame resistant composite article is formed as a garment and wherein the facial layer is oriented away from the body of a wearer.

The disclosure also relates to any one of the previous embodiments, wherein there is provided a method for producing a flame resistant composite article comprising the steps of providing a meltable layer having an inner side and an outer side; providing a heat reactive material comprising a polymer resin and a graphite mixture; applying the polymer resin-graphite mixture to the inner surface of the meltable layer; providing an inner layer; attaching the inner layer to the heat reactive material; providing a facial layer; and attaching the facial layer to the outer side of the meltable layer.

Also provided is a flame resistant composite article comprising or consisting essentially of a meltable film; a heat reactive material comprising a polymer resin and a graphite; and an inner layer, wherein the heat reactive material is disposed between the meltable film and the inner layer.

DESCRIPTION OF THE DRAWINGS

The operation of the present invention should become apparent from the following description when considered in conjunction with the accompanying drawings, in which.

DETAILED DESCRIPTION OF THE DISCLOSURE

Figure 1:
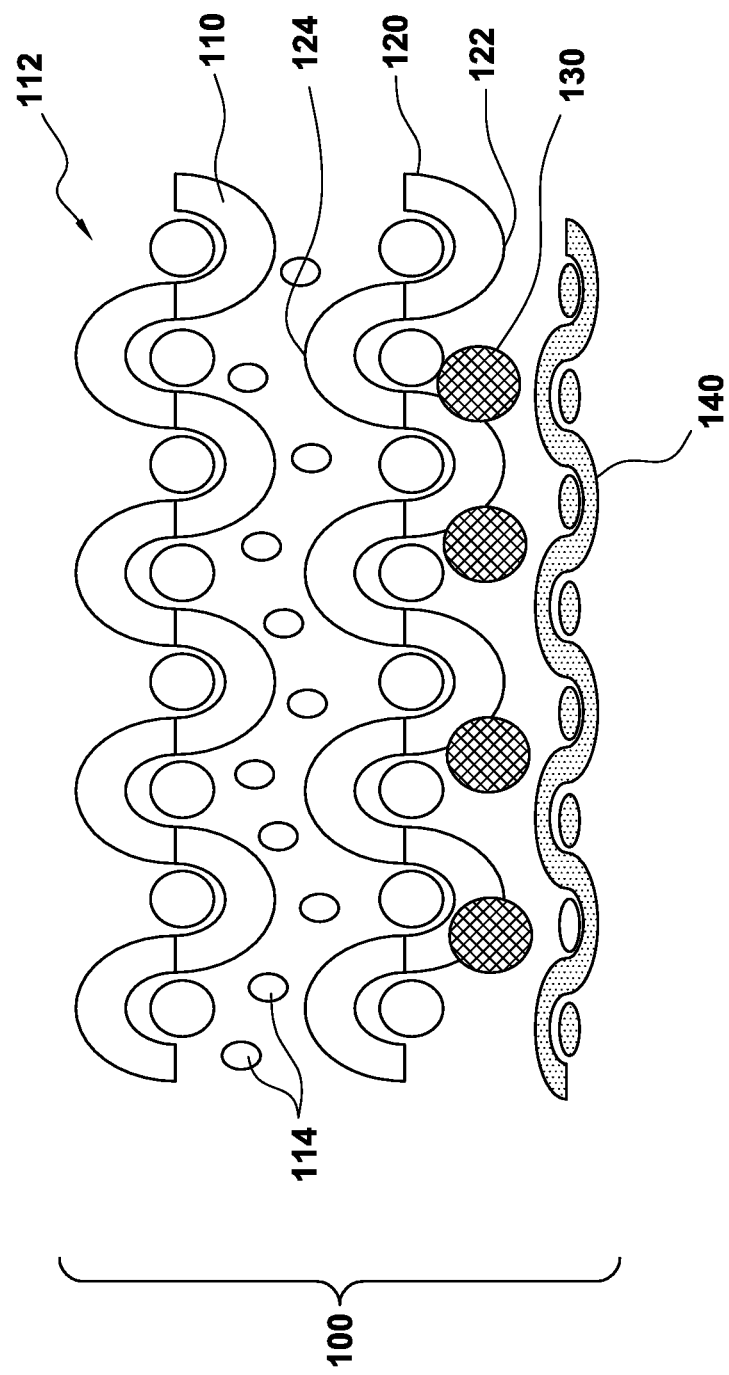
FIG. 1 is a schematic illustration of a cross-sectional view of one embodiment described herein.

Composite articles having a meltable layer and heat reactive material are used as protective clothing. Protective clothing includes garments like jackets, trousers, shirts, vests, overalls as well as gloves, gaiters, hoods and shoes. Protective clothing needs to be lightweight to be widely used, especially in cases where the danger of a flash fire is present but of a low probability. To reduce weight of the composite article, the weight of the individual layers has to be reduced without losing protective properties or decreasing breathability or waterproofness. As described herein a layer for which the weight can be reduced is a meltable layer adjacent to the heat reactive material. However, when reducing the weight of the meltable layer, the underlying heat reactive material tends to cause surface deformations or bleed through, resulting in discoloration and/or surface unevenness of the meltable layer and can increase production costs. The solution is to make the meltable layer thinner and more lightweight, and further to add a facial layer that masks the surface deformations and reduces visible bleed through of the heat reactive material through to the facial layer. The added benefit is that a wider range of materials may be used as the facial layer, including prints and colors. The use of a lightweight meltable facial layer provides a lightweight flame resistant composite article that provides improvements to aesthetics because the facial layer does not change color due to the relatively dark colored heat reactive material. The composite articles described herein can accommodate a relatively lightweight meltable layer and still retain excellent flame resistance and a relatively flat surface.

Garments made from the flame resistant composite article disclosed herein are robust so that they can be used with all types of colors and patterns and have the look and feel of a traditional technical garment. This can also provide a lightweight, waterproof, or water resistant garment with enhanced burn protection. The composite articles provide better production flexibility, including less volume of raw materials and improved production speed, and also reduce production expense.

Some embodiments provide a lightweight flame resistant composite article that provides improvements to aesthetics because the facial layer does not change color due to the relatively dark colored heat reactive material. The composite articles described herein can accommodate a relatively lightweight facial layer and still retain excellent flame resistance and a relatively flat surface. The composite articles provide better production flexibility, including less volume of raw materials and improved production speed, and also reduce production expense.

The disclosure relates to a flame resistant composite article comprising a facial layer, a meltable layer, a heat reactive material comprising a polymer resin and a graphite, and an inner layer, wherein the facial layer is attached to the meltable layer and the heat reactive material is disposed between the meltable layer and the inner layer. In some embodiments, the flame resistant composite article consists of, or consists essentially of a facial layer, a meltable layer, a heat reactive material comprising a polymer resin and a graphite, and an inner layer, wherein the facial layer is attached to the meltable layer and the heat reactive material is disposed between the meltable layer and the inner layer. The disclosure also relates to a flame resistant composite article comprising a meltable film, a heat reactive material comprising a polymer resin and a graphite, and an inner layer, wherein the heat reactive material is disposed between the meltable layer and the inner layer. In still further embodiments, the flame resistant composite article consists of, or consists essentially of a meltable film, a heat reactive material comprising a polymer resin and a graphite, and an inner layer, wherein the heat reactive material is disposed between the meltable layer and the inner layer. Used in this context, consisting essentially of means that the flame resistant composite article contains those layers mentioned, attached or bonded to one another in the specified order, and no other additional layers, with the exception of an optional adhesive layer between one or more of the facial, meltable and/or inner layers.

In some embodiments and as shown in FIG. 1, the flame resistant composite article (100) comprises a facial layer (110) that is adjacent to a meltable layer (120), a heat reactive material (130) comprising a polymer resin and a graphite, for example, an expandable graphite which is disposed in a space apart relationship between the meltable layer (120) and an inner layer (140). The facial layer and the meltable layer can be laminated together, for example using an adhesive (114). In some embodiments, the heat reactive material (130) is disposed on an inner side (122) of the meltable layer (120). An outer surface (112) of the facial layer (110) is exposed and visual to the environment. The heat reactive material (130) does not penetrate through to or does not come into contact with the facial layer (110) so that heat reactive material (130) is not visible and does not cause a color change or surface deformation on the outer surface (112). Depending on the material of the facial layer (110), the outer surface (112) has a surface topology that provides the look and feel of a garment. To improve the aesthetic appearance of the composite article, the heat reactive material (130) should not cause deformations to form an undesirable grid or darkening pattern on the outer surface (112). A darkening pattern is a result of the typically darker color of the expandable graphite in the heat reactive material (130) relative to the meltable layer (120) and is not desirable. Specifically, the outer surface (112) of the facial layer (110) appears without deformations, e.g., without a dimples or bumps from the heat reactive material (130).

The facial layer can comprise one or more materials that are attached to the meltable layer. The one or more facial layer materials can be textile, film or a combination thereof. The facial layer comprises materials comprising non-meltable materials or meltable materials. Materials are considered to be meltable when they meet the criteria when tested according to the Melting and Thermal Stability test disclosed herein. The facial layer may also be flammable or nonflammable. Materials are tested with the Vertical Flame test, disclosed herein, to determine whether they are flammable or nonflammable.

In some embodiments, the facial layer can comprise a textile, for example, a colored or printed, relatively lightweight textile. Suitable textiles can be, for example, woven, knit, non-woven materials, multilayer nonwoven materials or a combination thereof. In some embodiments, the textile can be a polyamide, a polyester, a polypropylene, a polyethylene textile or a multilayer laminate thereof. In some embodiments the facial layer comprises polyamide fibers with a denier weight of 30 denier (D), 40 D, or 70 D. In some embodiments the facial layer comprises nylon twill, e.g. 30 D nylon twill, 40 D nylon twill, or 70 D nylon twill. Optionally, the facial layer can be waterproof and/or the facial layer can be coated with a layer of a durable water resistant (DWR) coating. This DWR coating can be on the outer side of the facial layer. In another embodiment, the facial layer is uncoated but comprises a waterproof material.

In some embodiments, the facial layer is relatively lightweight, for example, the facial layer can have a weight of less than 150 $g/m^2$, less than 100 $g/m^2$, less than 70 $g/m^2$, less than 50 $g/m^2$, less than 40 $g/m^2$, less than 33 $g/m^2$, less than 30 $g/m^2$, less than 20 $g/m^2$, less than 10 $g/m^2$, less than 5 $g/m^2$, less than 3 $g/m^2$, less than 1 $g/m^2$, or less than 0.8 $g/m^2$. In some embodiments, the facial layer weight is from 33 $g/m^2$ to 0.5 $g/m^2$, from 25 $g/m^2$ to 1 $g/m^2$ or from 25 $g/m^2$ to 5 $g/m^2$.

The flame resistant composite article also comprises a meltable layer, wherein the meltable layer is disposed between the facial layer and the heat reactive material. The meltable layer can be at least one meltable textile layer, at least one meltable film layer or a combination thereof. In some embodiments the meltable layer is a textile, wherein the textile is a woven, knit, a non-woven material, a multilayer nonwoven material or a combination thereof. In other embodiments, the meltable layer can also comprise a composite with at least one meltable component. In some embodiments, the meltable layer is lightweight, having a weight less than or equal to 50 grams/square meter ($g/m^2$), e.g., less than 40 $g/m^2$, less than 33 $g/m^2$, less than 30 $g/m^2$, less than 20 $g/m^2$, or less than 10 $g/m^2$. The meltable layer (120) is thin and relatively lightweight to reduce the weight of the composite article (100) but this causes potential deformations and bleed through of heat reactive material on the intermediate surface (124) of the meltable layer (120). Without providing a facial layer (110), the meltable layer (120) would have to be thicker and this may cause a loss of breathability and reduces the types of materials available for meltable layer (120).

Textiles which are suitable as the meltable layer can include, for example, polyamides, for example, nylon, nylon 6, nylon 6,6; polyester, polyethylene terephthalate, polytrimethylene terephthalate; polyurethane; polyolefin, polyethylene, polypropylene or a combination thereof. Spunbond or meltblown non wovens can also be used, for example, TYVEK® polyolefin. In further embodiments, the meltable layer can be a tricot knit, e.g., a polyamide tricot knit, a microporous polyolefin, microporous polyester, or a microporous polyurethane. A knit construction may provide a lightweight material.

In other embodiments, the meltable layer can be a meltable film, for example a microporous film or a nonporous film. The term "microporous" means a film that has an average pore size in the range of from 0.01 to 50 micrometers. The term "nonporous" means a film that is essentially impermeable to gas and/or liquid permeation, according to ASTM F1359 and/or ASTM F739 (1994). As used herein, the term "film" means a continuous layer having a larger ratio between surface area and thickness, i.e. the continuous layer is essentially two-dimensional. The film can be provided as a coating on a substrate or it can be free-standing and handled as a separate object.

In embodiments wherein the meltable layer is a meltable film, the meltable film can be polyolefin, polyethylene, polypropylene, ethyl vinyl alcohol (EVOH), ethyl vinyl acetate (EVAc), polyvinyl chloride (PVC), polyvinylidene chloride (PVdC), polyvinyl fluoride, polyvinylidene fluoride, fluoropolymers, polyurethane, polyesters, polyamides, polyethers, polyacrylates and polymethacrylates, copolyetheresters, and copolymers and multilayer laminates thereof. Specific films suitable for the meltable layer can be polyethylene, polypropylene, or polyurethane. In another embodiment specific films suitable for the meltable layer can be microporous polyethylene, microporous polypropylene, or microporous polyurethane. In some embodiments, the meltable film comprises a single layer film. In other embodiments, the meltable film comprises a multilayer film.

In those embodiments wherein the meltable film is a multilayer film, the individual layers of meltable film may be laminated in a conventional manner, for example, the layers can be coextruded, or a combination of coextrusion and adhesive lamination can be used.

The facial layer can be attached to the meltable layer using any known technique. In some embodiments, the facial layer is attached to the meltable layer using an adhesive (114). Suitable adhesives can include, for example, polyurethanes, polyesters, polyether esters, or a combination thereof. The adhesive can be in the form of a discontinuous adhesive layer, e.g. dots or grid, or in the form of a continuous adhesive layer.

The flame resistant composite article also comprises a heat reactive material comprising a polymer resin and a graphite, for example, an expandable graphite. An expandable graphite most suitable for use in the composites and methods disclosed herein has an average expansion rate of at least 9 micrometer/° C. (μm/° C.) between 180° C. and 280° C. Depending on the desired properties of the composite article, it may be desirable to use an expandable graphite having an expansion rate greater than 9 μm/° C. between 180° C. and 280° C., or an expansion rate greater than 12 μm/° C. between 180° C. and 280° C., or an expansion rate greater than 15 μm/° C. between 180° C. and 280° C. One expandable graphite suitable for use in certain embodiments expands by at least 900 micrometers (μm) in a thermo-mechanical analysis (TMA) expansion test described herein when heated to 280° C. Another expandable graphite suitable for use in certain embodiments expands by at least 400 μm in TMA expansion test described herein when heated to 240° C. Expandable graphite particle size suitable for present invention should be chosen so that the polymer resin-expandable graphite mixture may be applied with the selected application method. For example, where the polymer resin-expandable graphite mixture is applied by a gravure printing techniques, the expandable graphite particle size should be small enough to fit in the gravure cells.

Polymer resins having a melt or softening temperature of less than 280° C. are suitable for use in the heat reactive material. In some embodiments, the polymer resins are sufficiently flowable or deformable to allow the expandable graphite to expand substantially upon heat exposure at or below 280° C. It may be desirable that the extensional viscosity of a polymer resin is low enough to allow for the expansion of expandable graphite and high enough to maintain the structural integrity of the heat reactive material after expansion of the mixture of polymer resin and expandable graphite. In other embodiments, a polymer resin is used which has a storage modulus between 103 and 108 dyne/cm² and Tan delta between 0.1 and 10 at 200° C. In another embodiment, a polymer resin is used that has a storage modulus between 103 and 106 dyne/cm². In another embodiment, a polymer resin is used that has a storage modulus between 103 and 104 dyne/cm². Polymer resins suitable for use in some embodiments are elastomeric. Other polymer resins suitable for use in some embodiments are cross-linkable, such as cross-linkable polyurethane, for example, MOR-MELT® R7001E (from Rohm & Haas). In other embodiments, suitable polymer resins are thermoplastic having a melt temperature between 50° C. and 250° C., such as DESMOMELT® VP KA 8702 (from Bayer Material Science LLC). Polymer resins suitable for use in embodiments described herein comprise polymers which include but are not limited to polyesters, thermoplastic polyurethanes and cross-linkable polyurethanes, and combinations thereof. Other polymer resins may comprise one or more polymers selected from polyester, polyamide, acrylic, vinyl polymer, polyolefin. Other polymer resins may comprise silicone or epoxy. Flame retardant materials may be optionally incorporated in the polymer resin. In one embodiment, the resins may include at least one component or additive selected from the group consisting of chlorinated compounds, brominated compounds, antimony oxide, organic phosphorous-based compounds, phosphate esters, resorcinol bis(diphenyl phosphate), zinc borate, ammonium polyphosphate, melamine cyanurate, melamine polyphosphate, molybdenum compounds, alumina trihydrate and magnesium hydroxide, which may enhance the flame resistance of the composite articles. In embodiments, the polymer resin may contain and/or function as an adhesive, for example, for attaching the meltable layer to the inner layer.

In some embodiments, upon exposure of the composite article to flames and/or extreme heat, for example, a temperature greater than or equal to 280° C., the meltable layer melt absorbs into the heat reactive material. At the same time, the heat reactive material can expand. This process can also form a char comprised of the meltable layer and the heat reactive material. In another embodiment in addition to the meltable layer, the facial layer also melts and becomes part of the char.

In an embodiment, the char resulting from exposure of the facial layer/meltable layer and the heat reactive material to heat and/or high temperatures, for example, greater than or equal to 280° C. is a heterogeneous melt mixture of the facial layer/meltable layer and the expanded heat reactive material. A char, according to this disclosure, is meant to refer to the carbonaceous material remaining after exposing the meltable layer and the heat reactive material to a temperature of greater than or equal to 280° C. The char is a mixture of the expanded graphite and one or both of the melted polymer resin and the meltable layer. At temperatures greater than or equal to 280° C., one or both of the meltable layer and polymer resin may also oxidize or participate in the combustion process forming additional carbonaceous material that becomes part of the char. The formation of the char can help to insulate the layers below the char from exposure to heat.

In an embodiment, upon exposure of the composite article to flames and/or extreme heat, the heat reactive material can expand within (or mix with) the meltable layer without the heat reactive material or the meltable layer expanding into the facial layer or inner layer. In doing so the heat reactive material mixes with the meltable layer and protects the layers beneath and the wearer of the article. In another embodiment, upon exposure of the composite article to flames and/or extreme heat, the heat reactive material can expand within the meltable layer and also expand into the facial layer without expanding into the inner layer. In one embodiment, composite articles can have a break-open time that is increased by at least 20 seconds, or increased by at least 30 seconds, over a textile composite constructed of substantially the same materials in which the expansion process described above does not occur, when tested according to the method for Horizontal Flame Test described herein.

In some embodiments of the polymer resin-expandable graphite mixture, the mixture, upon expansion, forms a plurality of tendrils comprising expanded graphite. The total surface area of the polymer resin-expandable graphite mixture increases significantly when compared to the same mixture prior to expansion. In one embodiment, the surface area of the mixture is increased at least five times after expansion. In another embodiment, the surface area of the mixture increases at least ten times after expansion. In addition, tendrils will often extend outward from the expanded mixture. In an embodiment where the polymer resin-expandable graphite mixture is situated on a substrate in a discontinuous form, the tendrils will extend to at least partially fill the open areas between the discontinuous domains. In a further embodiment, the tendrils will be elongated, having a length to width aspect ratio of at least 5 to 1.

The polymer resin-expandable graphite mixture may be produced by a method that provides an intimate blend of polymer resin and expandable graphite, without causing substantial expansion of the expandable graphite. Suitable mixing methods include but are not limited to paddle mixer, blending and other low shear mixing techniques. In one method, the intimate blend of polymer resin and expandable graphite particles is achieved by mixing the expandable graphite with a monomer or prepolymer prior to polymerization of the polymer resin. In another method, the expandable graphite may be blended with a dissolved polymer, wherein the solvent in removed after mixing. In another method, expandable graphite is blended with a hot melt polymer at a temperature below the expansion temperature of the graphite and above the melting temperature of the polymer. In methods which provide an intimate blend of polymer resin and expandable graphite particles or agglomerates of expandable graphite, the expandable graphite is coated or encapsulated by the polymer resin prior to expansion of the graphite. In other embodiments, the intimate blend is achieved prior applying the polymer resin-expandable graphite mixture to a substrate.

The polymer resin-expandable graphite mixture comprises less than or equal to 50 weight percent (wt %), or less than or equal to 40 wt %, or less than or equal to 30 wt % of the expandable graphite based on the total weight of the polymer resin-expandable graphite mixture, and the balance substantially comprising the polymer resin. In other embodiments, the expandable graphite comprises less than or equal to 20 wt %, or less than or equal to 10 wt %, or less than or equal to 5 wt % of the mixture, and the balance substantially comprising the polymer resin. Generally, from 5 wt % to 50 wt % of expandable graphite based on the total weight of the polymer resin-expandable graphite mixture, is desired. In some embodiments, desirable flame resistance performance may be achieved with even lower amounts of expandable graphite. Loadings as low as 1 wt % may be useful. Depending on the properties desired and the construction of the resulting textile composites, other levels of expandable graphite may also be suitable for other embodiments. Other additives such as pigments, fillers, antimicrobials, processing aids and stabilizers may also be added to the mixture.

Figure 6B:
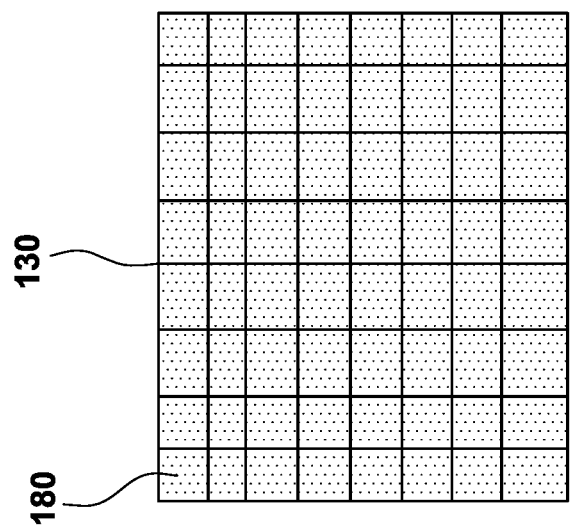
FIG. 6b is a schematic illustration of one embodiment of a pattern of a polymer resin-expandable graphite applied in a grid.
Figure 6A:
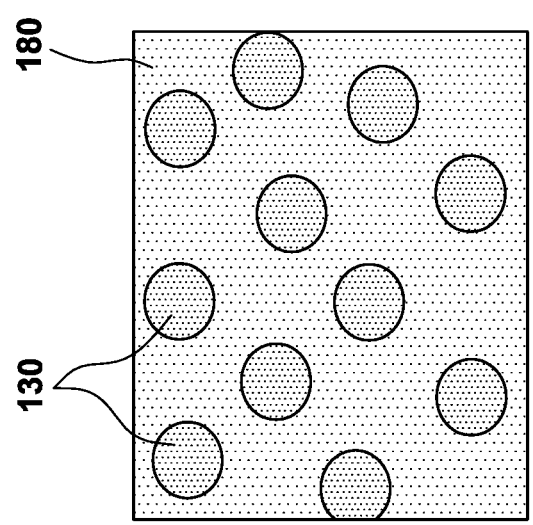
FIG. 6a is a schematic illustration of one embodiment of a polymer resin-expandable graphite applied as discrete dots.
Figure 7:
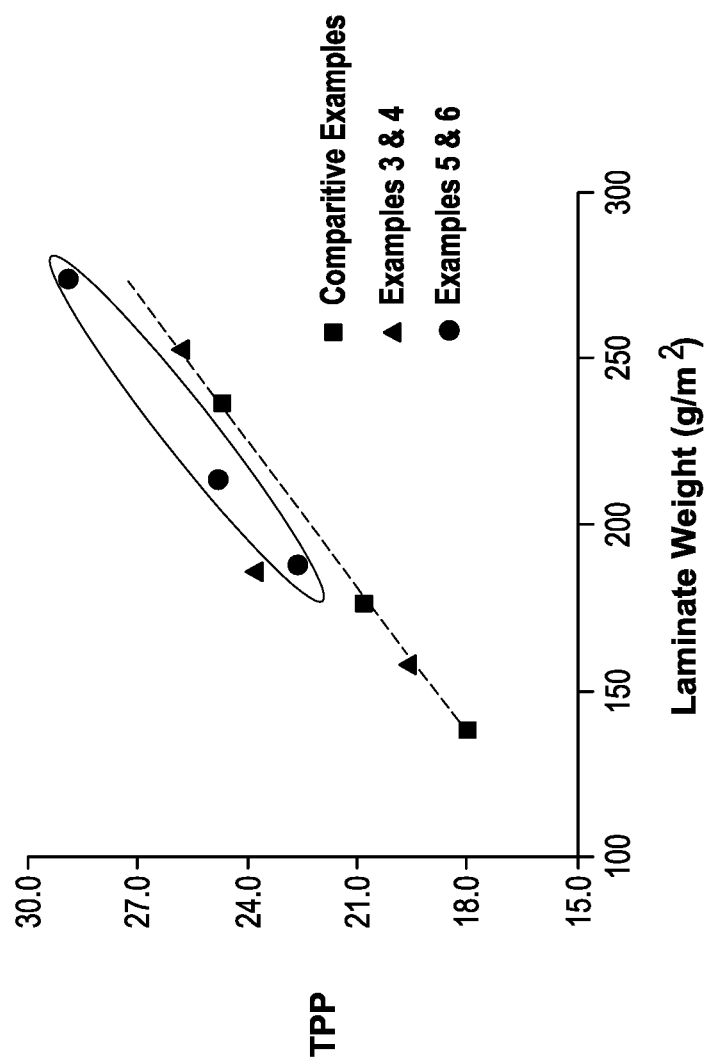
FIG. 7 is a graphical representation of the thermal protective performance of Examples and Comparative Examples.

The polymer resin-expandable graphite mixture may be applied to the inner layer (140) or to the meltable layer (120) to form the heat reactive material (130) such as exemplified in FIG. 1. In some embodiments, the heat reactive material may be applied as a continuous layer. However, where enhanced breathability and/or hand is desired, the polymer resin-expandable graphite mixture may be applied discontinuously to form a layer of heat reactive material having less than 100% surface coverage. A discontinuous application providing less than 100% surface coverage may take a variety of forms including, but not limited to, dots, grids, lines or a combination thereof. In some embodiments with discontinuous coverage, the average distance between adjacent areas of the discontinuous pattern is less than 5 millimeters (mm), or preferably less than 3.5 mm, 2.5 mm, 1.5 mm, or 0.5 mm. The average distance between adjacent areas can be measured by measuring the spacing between adjacent dots. In embodiments where properties such as hand, breathability, and/or textile weight are important, a surface coverage of less than 90%, or less than 80%, or less than 70%, or less than 60%, or less than 50%, or less than 40%, or less than 30% may be used. The percent coverage may be calculated by measuring the geometry of the gravure cell or screen printing masks, depending on which application method is used. One method for achieving a coverage of less than 100% comprises applying the heat reactive material by printing the mixture onto a surface of the meltable layer or the inner layer by, for example, gravure printing. FIGS. 6a and 6b illustrate examples in which the layer of heat reactive material (130) is provided in discontinuous patterns of dots (6A) and grids (6B) to a substrate (180) such as the inner layer or to the inner side of the meltable layer. The polymer resin-expandable graphite mixture may be applied at a rate to achieve an add-on weight of between 10 g/m² to 100 g/m² of the mixture. In some embodiments, the mixture is applied at a rate to achieve an add-on weight of less than 100 g/m², or less than 75 g/m², or less than 50 g/m², or less than 25 g/m². The add-on weight can be determined by weighing identical sized samples of the layer before and after the heat reactive material is applied and normalizing the size of the sample to one square meter.

In one discontinuous application, such as in the application of discrete dots (130) in FIG. 6A, the polymer resin-expandable graphite mixture is applied to the inner layer or the meltable layer forming a layer of heat reactive material (130) in the form of a multiplicity of discrete pre-expansion structures comprising the polymer resin-expandable graphite mixture. Upon expansion, the discrete dots form a multiplicity of discrete expanded structures having structural integrity thereby providing sufficient protection to a composite article to achieve the enhanced properties described herein. By structural integrity it is meant that the heat reactive material after expansion withstands flexing or bending without substantially disintegrating or flaking off the inner layer or the meltable layer, and withstands compression upon thickness measurement when measured according to the Thickness Change Test described herein.

The heat reactive material may be applied in other forms in addition to dots, lines, or grids. Other methods for applying the material may include screen printing, or spray or scatter coating or knife coating, provided the heat reactive material may be applied in a manner in which the desired properties upon exposure to heat or flame are achieved.

In some embodiments, the material of the meltable layer may combine with the expanding heat reactive material during exposure to heat and/or flame that is sufficient to melt the meltable materials to form an expanded composite due to the formation of char. In some embodiments, the meltable material may be sufficiently drawn into or adsorbed on at least a portion of the expanding heat reactive material. The resulting expanded composite may comprise the elongated tendrils of the heat reactive material and the meltable material. In some embodiments, the expanded composite has structural stability when tested in accordance to the Thickness Change Test. In some embodiments, the composite of the present disclosure changes thickness upon heat exposure. The thickness of the composite article after expansion is at least 0.5 mm greater, e.g., at least 0.8 mm greater, at least 1 mm greater, at least 1.5 mm greater, at least 2 mm greater, than the thickness of the composite article prior to expansion. In other embodiments, the thickness of the composite article after exposure to flame and or extreme heat is at least 20% greater than the thickness of the composite article before exposure to flame and/or extreme heat.

The flame resistant composite article also comprises an inner layer. In some embodiments comprising an inner layer (140), as exemplified in FIG. 1, the layer of heat reactive material (130) may be disposed on the meltable layer (120) or on the inner layer (140). In some methods, the heat reactive material is applied in a manner in which the mixture provides an adhesive bond between the inner layer and the meltable layer. In embodiments where the composite article comprises a laminate construction, the heat reactive material is applied as an adhesive, for example, to bond the inner side of the meltable layer (120) and the inner layer (140), forming a layer of heat reactive material between the meltable layer (120) and the inner layer (140). In another method, the heat reactive material is applied to the composite article forming a layer of heat reactive material which may optionally be disposed at least partially within surface pores or surface voids of one or both of the layers (120 and 140).

In further embodiments, the inner layer (140) of the flame resistant composite article can comprise a convective barrier that can be a textile, for example, knit, woven or nonwoven material or a convective barrier film. The convective barrier is a non-meltable barrier that prevents the convective heat transfer to the surfaces or layers behind it, when exposed to a convective heat source and further enhance the performance of the composite article upon exposure to flame and/or heat. The inner layer (140) can be attached, for example, by the heat reactive material (130) to the meltable layer (120) as illustrated in FIG. 1. Materials suitable for use as the inner layer (140) include, for example, textiles and films which are not meltable according to the Melting and Thermal Stability Test as presented herein. Examples of suitable convective barriers include aramids, Flame Resistant (FR) cottons, polybenzimidazole (PBI), polybenzoxazole (PBO), FR rayon, modacrylic blends, polyamines, carbon, fiberglass, polyacrylocnitrile (PAN), polytetrafluoroethylene, polyimides, silicones and blends and combinations thereof. Films suitable for use as the inner layer can comprise convective barriers such as, for example, polyimide, silicone, polytetrafluoroethylene (PTFE), such as dense PTFE or expanded PTFE.

In some embodiments, the inner layer can comprise water vapor permeable (breathable) or water vapor impermeable (non-breathable) convective barrier material(s). Convective barriers for use in embodiments described herein have a maximum air permeability of less than 10 Frazier after thermal exposure when tested as per the Air permeability test method described herein. Preferably, a convective barrier has an air permeability after thermal exposure of less than 5 Frazier. More preferably, a convective barrier has an air permeability after thermal exposure of less than 3 Frazier.

Figure 2:
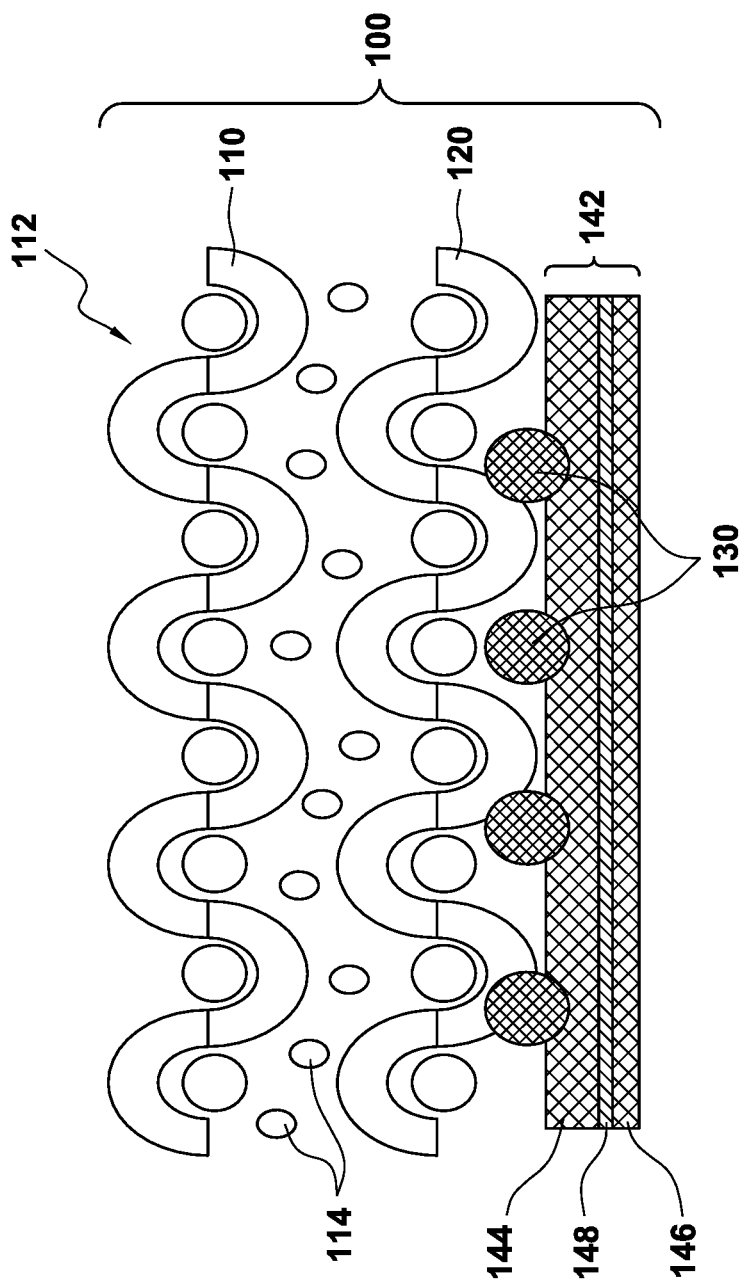
FIG. 2 is a schematic illustration of cross-sectional view of another embodiment described herein.

In further embodiments, as exemplified in FIG. 2, the composite article (100) may comprise an inner layer (142) that is a multilayer convective barrier. The inner layer (142) may comprise two or more layers of a convective barrier film (144 and 146) and, for example, a polymer layer (148) there between. The polymer layer (148) may be waterproof, breathable, air impermeable or a combination thereof.

Figure 3:
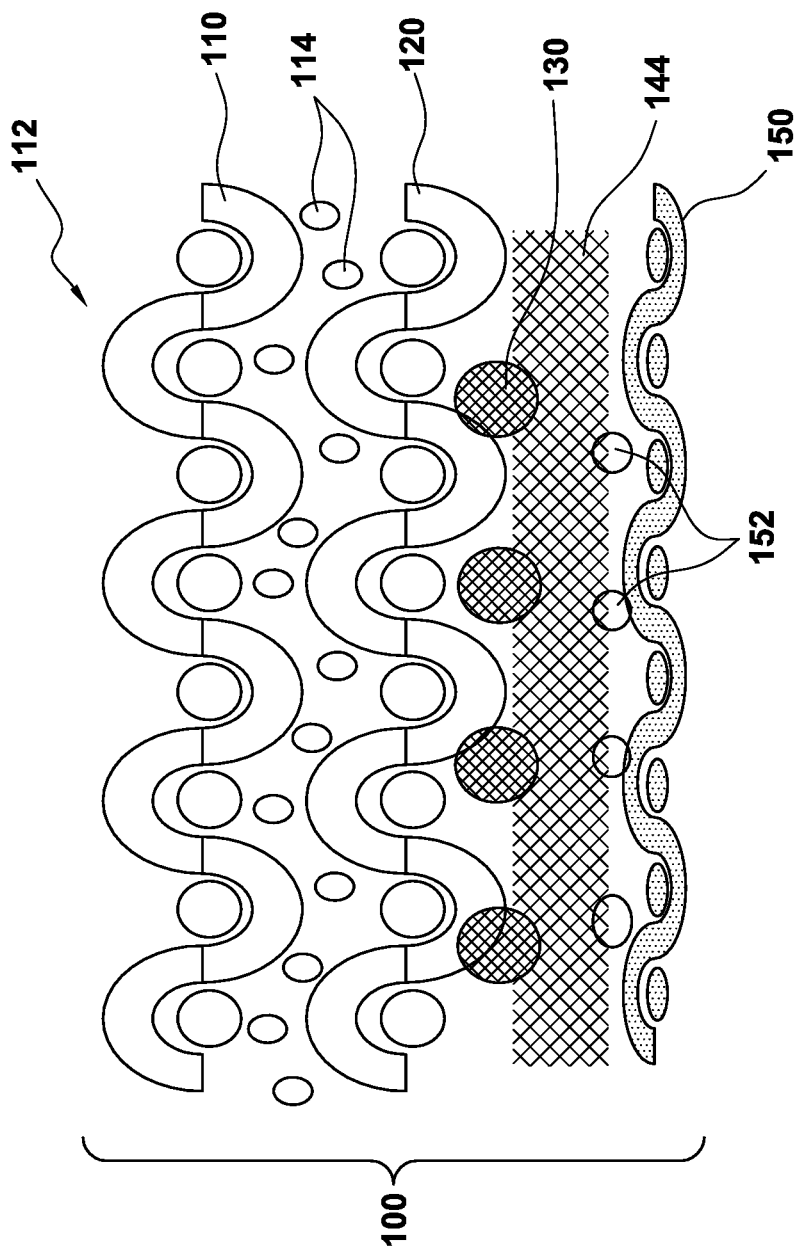
FIG. 3 is a schematic illustrating one embodiment described herein.

In other embodiments, such as the one illustrated in FIG. 3, the composite article (100) may further comprise a textile backer (150) positioned on a side of the inner layer (144) that is opposite the heat reactive material (130). The textile backer (150) may be attached with an adhesive (152) to the inner layer (144). Preferably, the backer textile (150) is a thermally stable textile backer, such as a material which passes the melting and thermal stability test described herein.

Figure 4:
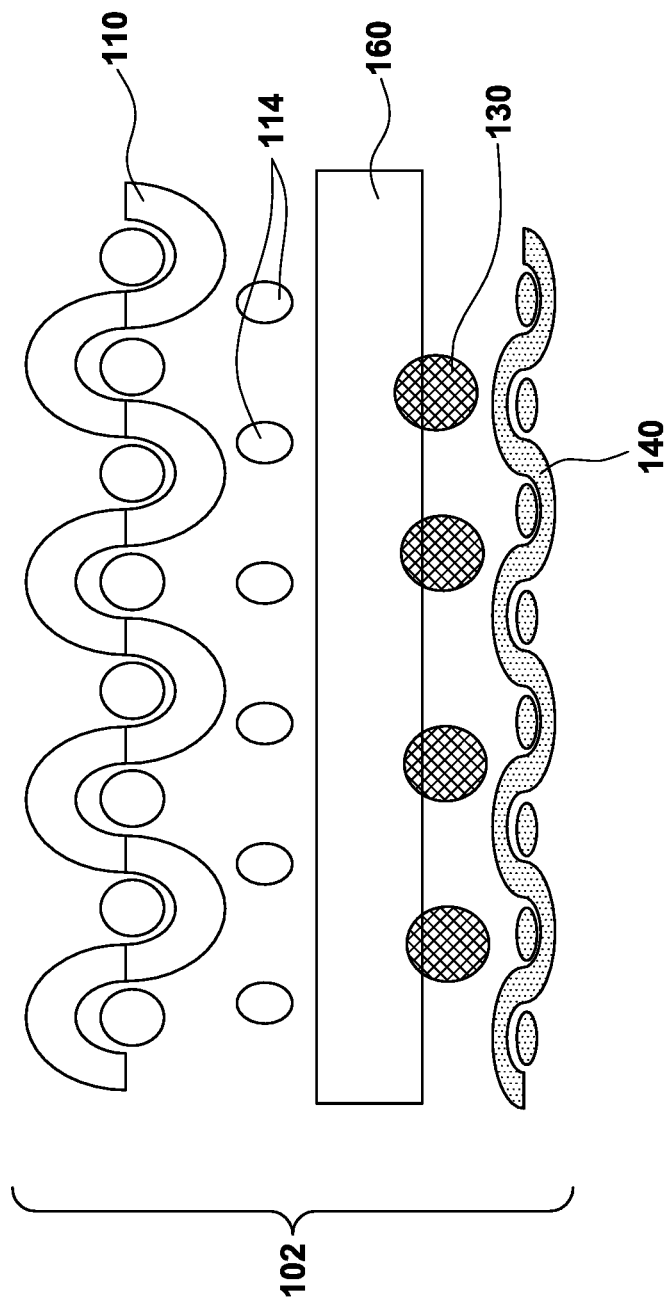
FIG. 4 is a schematic illustration of another embodiment described herein.

With reference to FIG. 4, a composite article (102) comprising a facial layer (110) that is adjacent to a meltable film (160) is provided. The heat reactive material (130) is disposed between the meltable film (160) and an inner layer (140).

Figure 5:
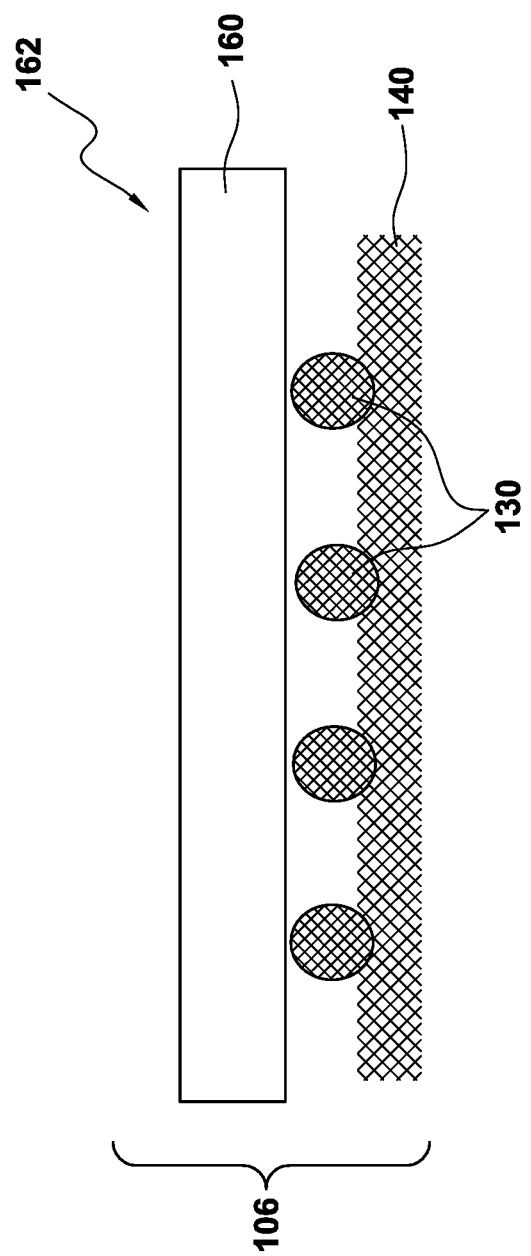
FIG. 5 is a schematic illustration of another embodiment described herein.

The disclosure further relates to a flame resistant composite article comprising a meltable film, a heat reactive material comprising a polymer resin and a graphite and an inner layer, wherein the heat reactive material is disposed between the meltable film and the inner layer, for example, as shown in FIG. 5. In other embodiments, the flame resistant composite article consists of or consists essentially of a meltable film, a heat reactive material comprising a polymer resin and a graphite and an inner layer, wherein the heat reactive material is disposed between the meltable film and the inner layer, for example, as shown in FIG. 5. Used in this context, "consisting essentially of" means that the flame resistant composite article contains those layers mentioned, attached or bonded to one another in the specified order, and no other additional layers on the meltable film, however, at least one additional inner layer may be present, for example, an inner textile layer positioned on the inner layer on the side opposite the heat reactive material wherein the inner textile layer is any one or more of those textiles previously described. In some embodiments, the inner textile layer can provide greater comfort to the wearer.

As used herein, the term film means a continuous layer having a larger ratio between surface area and thickness, i.e. the continuous layer is essentially two-dimensional. The film can be provided as a coating on a substrate or it can be free-standing and handled as a separate object. The meltable film can comprise a single layer film or a multilayer film.

The meltable film can be a microporous meltable film, for example, microporous polyolefin, microporous polyester, microporous polyurethane that can be water vapor permeable (breathable) or water vapor impermeable (non-breathable). The term "microporous" means a film that has an average pore size in the range of from 0.01 to 50 micrometers. The term "nonporous" means a film that is essentially impermeable to gas and/or liquid permeation, according to ASTM F1359 and/or ASTM F739 (1994). As used herein, the term breathable means that the layer can have a moisture vapor transmission rate (MVTR) of greater than 1000 $g/m^2/$24 hr. In other embodiments, the MVTR, expressed as $g/m^2/24$ hr, of the facial layer can be greater than or equal to 5000 or greater than or equal to 10,000 or greater than or equal to 20,000.

In some applications where breathability is less important to protective garments, for example, for protection against chemical spills or biological exposure, a non-porous and gas impermeable film may be used as the meltable continuous film. As used herein the phrase "exposure" means human contact to harmful or potentially harmful biological materials, such as, for examples, irritants, bacteria, viruses, microscopic organisms that pose a threat to human life. In some embodiments, the meltable continuous film does not allow chemicals or biological materials to penetrate from the surface of the composite article to the wearer. In embodiments of the invention, the meltable film can comprise polyethylene, polypropylene, EVOH, EVAc, PVC, PVdC, polyvinyl fluoride, polyvinylidene fluoride, fluoropolymers, polyurethane, polyesters, polyamides, polyethers, polyacrylates and polymethacrylates, copolyetheresters, and copolymers and multilayer laminates thereof. In still further embodiments, the meltable film can be polyethylene, polypropylene, or polyurethane.

In a further embodiment, the meltable film (160) comprises a surface (162) that can be exposed to the environment and away from the wearer as shown in FIG. 5. In some embodiments, surface (162) can serve as the outer layer and no facial layer (110) is employed in this embodiment. A heat reactive material (130) is disposed between the meltable film (160) and an inner layer (140) to form composite (106). An advantage of composite (106) is that it can be relatively lightweight but still provide protection against exposure to multiple hazards, including flame, heat, and chemical and biological hazards. In other embodiments, any of the facial layers that were previously described can be applied to the surface (162) of the meltable layer (160).

Further embodiments relate to a method for producing a flame resistant composite article comprising providing a meltable layer having an inner side and an outer side, providing a heat reactive material comprising a polymer resin and a graphite, applying the polymer resin graphite to the inner surface of the meltable layer, providing an inner layer, attaching the inner layer to the heat reactive material, providing a facial layer; and attaching the facial layer to the outer side of the meltable layer. The method involves taking a meltable layer with an inner side and an outer side and applying a heat reactive material such as a polymer resin-expandable material to the inner surface of the meltable material. The method can further include the step of applying a durable water resistant (DWR) coating to the facial layer. An inner layer is attached to the heat reactive material to form an intermediate product. A facial layer is then attached to the outer side of the meltable material of the intermediate product to form the composite article. As used herein, the term "attaching" means bonding, adhesively securing or otherwise laminating one surface to another. Lamination techniques and the use of lamination adhesives are known in the art.

As described one advantage of the embodiments is that the material of the facial layer can be expanded to allow the use of meltable and non-meltable materials.

The methods described provide enhanced properties which are particularly beneficial to textile composites comprising a facial layer which comprises materials comprising non-meltable materials or meltable materials. Materials that are meltable when tested according to the Melting and Thermal Stability test. The facial layer may also be flammable or nonflammable. Materials are tested with the Vertical Flame test to determine whether they are flammable or nonflammable. In embodiments, the composite article is comprised of a facial layer(s) which is knit or woven, and the facial layer has a weight of less than 150 $g/m^2$, e.g, less than 100 $g/m^2$, less than 70 $g/m^2$, less than 50 $g/m^2$, less than 33 $g/m^2$, less than 30 $g/m^2$, less than 20 $g/m^2$, less than 10 $g/m^2$, less than 5 $g/m^2$, less than 3 $g/m^2$, less than 1 $g/m^2$, or less than 0.8 $g/m^2$. In some embodiments, the facial layer weight is from 33 $g/m^2$ to 0.5 $g/m^2$.

A method is also provided for reducing the predicted percent body burn after exposure to flame when tested according to the ASTM F1930 Garment Flammability Test (Pyroman) described herein. The method comprises providing a composite article comprising a facial layer, a meltable layer comprising a meltable material, and an inner layer, having a heat reactive material between the meltable layer and the inner layer. The method further comprises constructing a garment from the composite wherein the facial layer is oriented away from the body of the wearer and toward the source of the flame.

In one embodiment, the flame resistant composite article as described herein is suitable for use in garments for workers in hazardous environments. The garments can be breathable, waterproof, and flame resistant, while being lightweight, flexible, comfortable to wear, and robust to be able to accommodate all colors and patterns. In embodiments, the composite article can have a thickness of less than 0.5 mm, e.g. less than 0.48 mm, less than 0.40 mm, less than 0.35 mm, less than 0.25 mm, less than 0.21 mm, or less than 0.2 mm, when measured according to ASTM D1777. In embodiments, the composite article can have an average weight of less than 275 $g/m^2$, e.g., less than 255 $g/m^2$, less than 240 $g/m^2$, less than 220 $g/m^2$, less than 200 $g/m^2$, less than 190 $g/m^2$, less than 185 $g/m^2$, less than 171 $g/m^2$, or less than 160 $g/m^2$.

In one embodiment, when tested according to the Thermal Protective Performance ASTM F2703-08 test method provided herein, the composite (100) has a thermal protective performance of 20 or higher. In another embodiment, upon exposure of the outer surface (112) of the facial layer (110) to a flame, the composite (100) has a Burned Area of less than 5 $cm^2$ after a 3 second exposure when tested according to the JIS Flammability test (JIS L1091 A-1 Method). In another embodiment, upon exposure of the outer surface (112) of the facial layer (110) to a flame, the composite (100) has a Burned Area of less than 50 $cm^2$ after a 60 second exposure when tested according to the JIS Flammability test (JIS L1091 A-1 Method).

Composites made according to the methods described herein preferably have a moisture vapor transmission rate (MVTR) greater than 1000 grams/square meter/24 hours ($g/m^2$/24 hr), or greater than 3000 $g/m^2$/24 hr, or greater than 5000 $g/m^2$/24 hr, or greater than 7000 $g/m^2$/24 hr, or greater than 9000 $g/m^2$/24 hr, or greater than 10000 $g/m^2$/24 hr, or higher. Preferred composite articles have a break open time greater than 50 seconds, greater than 60 seconds, or even greater than 120 seconds when tested according to the methods for Horizontal Flame Test described herein. Preferable composite articles also have an after flame less than 20 seconds when tested according to the Horizontal Flame Test and Self-Extinguishing Test methods described herein. Further preferred composite articles have an after flame less than 15 seconds, or less than 10 seconds, or less than 5 seconds. Preferred composite articles exhibit substantially no melt dripping behavior when tested in the Horizontal Flame test. In another embodiment, a composite article is formed according to the methods described herein, having a hand less than 300, or less than 250, or less than 200, and having an after-flame of less than 20 seconds, or less than 15 seconds or less than 10 seconds, or an after flame of zero, when measured according to the tests described herein for Flexibility and Hand, and Horizontal Flame Test and Self-Extinguishing Test.

Without intending to limit the scope of the present invention, the following examples illustrate how the present invention may be made and used:

Test Methods

Thermal Protective Performance

The Thermal Protective Performance ("TPP") of samples is measured according to ASTM F2703-08. The composite article sample is positioned horizontally and exposed to a combined convective and radiant heat source with a heat flux of $84\pm2$ kW/m$^2$. The unsteady-state heat transfer of heat through the composite article sample is measured using a copper slug calorimeter. The change in temperature versus time is used, along with the known properties of copper, to determine the respective thermal energy passed through the sample. A Thermal Performance Estimate value of the sample is determined iteratively as the intersection of time-dependent cumulative heat response as measured by the calorimeter to a time-dependent, empirical predicted second-degree burn injury performance curve. The units are given in cal/cm$^2$.

Horizontal Flame Test

This test is modeled generally after MIL-C 83429B. A 75 mm by 250 mm textile composite sample (3 inch by 10 inch) is clamped in a steel fixture (400 mm long by 75 mm wide with a center window of 350 mm long and 50 mm wide) using binder clips. The sample is clamped in a manner that secures the edges of the textile composite without obstructing the area of textile composite present in the window of the steel clamping fixture. The sample in fixture is placed horizontally at a height of 40 mm in a 90 mm flame (based on butane at 2 psi using a Meker burner). The sample is exposed to the flame and the time is recorded until the convective barrier breaks open (or a hole forms in the face textile in case where convective barrier is not used), either by cracking or the formation of a hole, and light from the flame is evident when viewing through the crack or opening in the material. The sample is subsequently removed from the flame. The time recorded is referred to as the horizontal flame break open time. The sample is observed for melt dripping or falling droplets.

Self-Extinguishing Test

After the material sample is removed from the flame in the Horizontal Flame Test, above, the material is observed for any after flame and after flame time is recorded. If the sample exhibits any melt dripping or falling droplets, it is also recorded. If no after flame is observed, or if an after flame is observed upon removal but extinguishes within five (5) seconds after removal from the flame, the material is said to be self-extinguishing.

Vertical Flame Test

Testing is in accordance with the ASTM D6413 test standard. Samples are exposed to flame for 12-seconds. After-flame time is averaged for 3 samples. Textiles with after-flame of greater than 2 seconds are considered as flammable.

Flammability Test

The flammability of samples is measured according to the JIS L 1091 Method A1.

Garment Flammability Test Method

Test garments are evaluated for resistance to a simulated flash fire exposure employing procedures similar to ASTM F 1930-00 Standard Test Method for Evaluation of Flame Resistant Clothing for Protection Against Flash Fire Simulations Using an Instrumented Manikin. Prior to testing, a nude manikin calibration is done with a four-second exposure. After calibration, a cotton t-shirt (size 42 regular, weighing less than 7 oz/yd$^2$) and a cotton short (size M) are put on followed by the jacket made of. After dressing the manikin, a sophisticated computer system is used to control the test procedure, to include the lighting of pilot flames, exposing the test garment to the flash fire, acquisition of data for 120-seconds, followed by running the exhaust fans to vent the chamber. Data acquired by the system is used to calculate the incident heat flux, predicted burn injury for each sensor during and after the exposure, and produce a report and graphics for each test. Any continued flaming after exposure is noted as after flame and melt dripping or falling of droplets is also noted. The predicted burn injury data along with after flame and melt dripping observations is then reported. The predicted burn injury is calculated by dividing the total number of sensors that reach 2nd and 3rd degree burn by the number of sensors in the area covered by the test garment. The total percent body burn reported is the sum of the 2nd and 3rd degree burn percentages.

Melting and Thermal Stability Test

The test is used to determine the thermal stability of textile materials. This test is based on thermal stability test as described in section 8.3 of NFPA 1975, 2004 Edition. The test oven is a hot air circulating oven as specified in ISO 17493. The test is conducted according to ASTM D 751, Standard Test Methods for Coated Fabrics, using the Procedures for Blocking Resistance at Elevated Temperatures (Sections 89 to 93), with the following modifications:

Borosilicate glass plates measuring 100 mm×100 mm×3 mm (4 in.×4 in.×⅓ in.) are used.

A test temperature of 265° C., +3/−0° C. (510° F., +5/−0° F.) is used.

The specimens are allowed to cool a minimum of 1 hour after removal of the glass plates from the oven.

Any sample side sticking to glass plate, sticking to itself when unfolded, or showing evidence of melting or dripping is considered as meltable. Any sample side lacking evidence of meltable side is considered as thermally stable.

Moisture Vapor Transmission Rate (MVTR)

A description of the test employed to measure moisture vapor transmission rate (MVTR) is given below. The procedure has been found to be suitable for testing films, coatings, and coated products.

In the procedure, approximately 70 ml of a solution consisting of 35 parts by weight of potassium acetate and 15 parts by weight of distilled water are placed into a 133 ml polypropylene cup, having an inside diameter of 6.5 cm at its mouth. An expanded polytetrafluoroethylene (PTFE) membrane having a minimum MVTR of approximately 85,000 g/m$^2$/24 hrs. as tested by the method described in U.S. Pat. No. 4,862,730 (to Crosby), is heat sealed to the lip of the cup to create a taut, leakproof, microporous barrier containing the solution.

A similar expanded PTFE membrane is mounted to the surface of a water bath. The water bath assembly is controlled at 23° C. plus 0.2° C., utilizing a temperature controlled room and a water circulating bath.

The sample to be tested is allowed to condition at a temperature of 23° C. and a relative humidity of 50% prior to performing the test procedure. Samples are placed so the microporous polymeric membrane is in contact with the expanded polytetrafluoroethylene membrane mounted to the surface of the water bath and allowed to equilibrate for at least 15 minutes prior to the introduction of the cup assembly.

The cup assembly is weighed to the nearest 1/1000g and placed in an inverted manner onto the center of the test sample.

Water transport is provided by the driving force between the water in the water bath and the saturated salt solution providing water flux by diffusion in that direction. The sample is tested for 15 minutes and the cup assembly is then removed, weighed again within 1/1000g.

The MVTR of the sample is calculated from the weight gain of the cup assembly and is expressed in grams of water per square meter of sample surface area per 24 hours.

Weight

Weight measurements on materials are conducted as specified in ASTM D751, section 10.

Tear Strength

Tear Strength measurements on materials are conducted as specified in JIS L1096 D method, described in section 8.17.4.

Thickness Change Test

Samples are tested for initial thickness as per ASTM D751, section 9 with the exception that the pressure foot diameter is 1". The instrument is adjusted to apply a pressure force of approximately 3.4 psi to the specimen. After exposure to Horizontal Flame Test for 60 seconds (or after break-open if break-open occurred prior to 60 seconds), the sample is re-measured for thickness change. Thickness and integrity of the expanded structure are observed after testing.

Air Permeability Test of Convective Barrier

Preferably, a convective barrier has an air permeability after thermal exposure of less than 5 Frazier. To determine the thermal stability of a convective barrier, a 381 mm (15 in.) square fabric specimen is clamped in a metal frame and then suspended in a forced air-circulating oven at 260° C. (500° F.). Following a 5-minute exposure, the specimen is removed from the oven. After allowing the specimen to cool down, the air permeability of the specimen is tested according to test methods entitled ASTM D 737-75. "Standard Test Method for AIR PERMEABILITY OF TEXTILE FABRICS." Specimens with less than 5 Frazier were considered as a thermally stable convective barrier.

Thickness of Convective Barrier

Convective barrier thickness is measured by placing the membrane between the two plates of a Käefer FZ1000/30 thickness snap gauge (Käefer Messuhrenfabrik GmbH, Villingen-Schwenningen, Germany). The average of three measurements is used.

Expansion Test

TMA (Thermo-mechanical analysis) is used to measure the expansion of expandable graphite particles. Expansion is tested with TA Instruments TMA 2940 instrument. A ceramic (alumina) TGA pan, measuring roughly 8 mm in diameter and 12 mm in height is used for holding the sample. Using the macroexpansion probe, with a diameter of roughly 6 mm, the bottom of the pan is set as zero. Then flakes of expandable graphite 0.1-0.3 mm deep, as measured by the TMA probe, are put in the pan. The furnace is closed and initial sample height is measured. The furnace is heated from 25° C. to 600° C. at a ramp rate of 10° C./min. The TMA probe displacement is plotted against temperature; the displacement is used as a measure of expansion.

Flexibility or Hand Measurement

Hand measurements of textile composite samples is obtained using a Thwing-Albert Handle-o-meter, (model #211-5 from Thwing Albert Instrument Company, Philadelphia, Pa., USA) Lower values indicate lower load required to bend the samples and indicates more flexible sample.

Color Measurement

Color data of the facial layers of each of the composite articles was measured using a COLOR i5 spectrophotometer, available from X-Rite, Inc., Grand Rapids, Mich., United States. The color difference was determined as defined by CIE Lab using the original (non-laminated) facial layer with white standard tile on back side as the standard, using the equation;

$$\Delta E^*_{ab} = \sqrt{(L^*_2-L^*_1)^2+(a^*_2-a^*_1)^2+(b^*_2-b^*_1)^2}$$

wherein $L^*_1$ is the lightness of the original textile;

$L^*_2$ is the lightness of the laminated facial layer;

$a^*_1$ is the position between red and green of the original textile;

$a^*_2$ is the position between red and green of the laminated facial layer;

$b^*_1$ is the position between yellow and blue of the original textile; and $b^*_2$ is the position between yellow and blue of the laminated facial layer.

Visual Appearance Test

The appearance of the composite article is determined by visually inspecting the facial layer. The dimple-like appearance of the facial layer of the composite article is ranked using the following 1, 2, 3, 4 or 5 scale, wherein 1 visually shows a flat surface, 3 visually shows moderate unevenness and 5 visually shows heavy unevenness.

EXAMPLES

Polymer Resin 1:

A flame retardant polyurethane resin was prepared by first forming a resin in accordance with the examples of commonly owned U.S. Pat. No. 4,532,316, and adding in the reactor a phosphorus-based additive FYROLFLEX® RDP, phosphate ester in an amount of about 20% by weight.

Preparation of Heat Reactive Material

A mixture of a polymer resin and expandable graphite was prepared by mixing about 20 grams (17 wt %) of an 80×150 mesh expandable graphite that was chemically modified to have an expansion of greater than 900 μm upon heating to 280° C. and 20 grams (17 wt %) of an FR additive to about 80 grams (67 wt %) of Polymer Resin 1. Mixing of expandable graphite into the polymer resin was carried out at about 100° C. using a low shear hand mixer for at least 1 minute to ensure uniform dispersion.

Thermally Stable Convective Barrier

A thermally stable convective barrier was constructed by treating ePTFE film having a 0.3 μm pore size and a 0.45 g/cc density with a continuous, partially penetrated layer of 12 g/m² of a breathable, moisture cured polyurethane in accordance with the teachings of U.S. Pat. No. 4,194,041.

The ePTFE film can be treated with an oleophobic coating as taught in U.S. Pat. No. 6,074,738.

Example 1

An intermediate laminate was made using a 33 g/m² nylon 6,6 tricot knit meltable layer with a thickness of 180 μm from Asahi Kasei Advance Corporation, Minato-Ku, Tokyo, Japan and a thermally stable convective barrier, as described above, as inner layer. The intermediate laminate was constructed by printing discrete dots of the heat reactive material onto thermally stable convective barrier and then adhering the 33 g/m² nylon 6,6 tricot knit meltable layer to the thermally stable convective barrier using a nip pressure of about 30 psi. The discrete dots of heat reactive material were printed by a gravure roller (at about 100° C. with a pressure of about 40 psi) in such a manner to provide coverage of approximately 32 percent on the surface of the meltable layer, with a laydown of about 65-70 g/m².

A flame resistant composite article was made in laminating a 38.5 g/m² nylon 6,6 woven ripstop facial layer from Asahi Kasei Advance Corporation, Minato-Ku, Tokyo, Japan with a thickness of 80 μm to the meltable layer of the intermediate laminate. The composite article was constructed by printing standard lamination adhesive in a discontinuous manner and with a laydown of 10 g/m² onto the meltable layer and then adhering the facial layer to the meltable layer.

The final composite product was obtained after applying a durable water repellant (DWR) coating to the outside of the facial layer.

Example 2

An intermediate laminate was made using a 7 g/m² polyethylene microporous meltable film layer with a thickness of 15 μm from LinYi Gelon LIB Co., Ltd., LinYi City, ShanDong, China and a thermally stable convective barrier, as described above, as inner layer. The intermediate laminate was constructed by printing discrete dots of the heat reactive material onto thermally stable convective barrier and then adhering the 7 g/m² polyethylene microporous meltable film layer to the thermally stable convective barrier using a nip pressure of about 30 psi. The discrete dots of heat reactive material were printed by a gravure roller (at about 100° C. with a pressure of about 40 psi) in such a manner to provide coverage of approximately 32 percent on the surface of the meltable layer, with a laydown of about 65-70 g/m².

A flame resistant composite article was made by laminating a 38.5 g/m² nylon 6,6 woven ripstop facial layer with a thickness of 80 μm to the meltable layer of the intermediate laminate. The composite article was constructed by printing standard lamination adhesive in a discontinuous manner and with a laydown of 10 g/m² onto the meltable layer and then adhering the facial layer to the meltable layer.

The final composite product was obtained after applying a durable water repellant (DWR) coating to the outside of the facial layer.

Comparative Example 1

A laminate was made using a 33 g/m² nylon 6,6 tricot knit meltable layer with a thickness of 180 μm from Asahi Kasei Advance Corporation, Minato-Ku, Tokyo, Japan and a thermally stable convective barrier as described above. The intermediate laminate was constructed by printing discrete dots of the heat reactive material onto thermally stable convective barrier and then adhering the 33 g/m² nylon 6,6 tricot knit meltable layer to the thermally stable convective barrier using a nip pressure of about 30 psi. The discrete dots of heat reactive material were printed by a gravure roller (at about 100° C. with a pressure of about 40 psi) in such a manner to provide coverage of approximately 32 percent on the surface of the meltable layer, with a laydown of about 65-70 g/m². The final composite product was obtained after applying a durable water repellant (DWR) coating to the outside of the facial layer.

Example 3

An intermediate laminate was made using a 7 g/m² polyethylene microporous meltable film layer with a thickness of 15 μm from LinYi Gelon LIB Co., Ltd., LinYi City, ShanDong, China and a thermally stable convective barrier, as described above, as inner layer. The intermediate laminate was constructed by printing discrete dots of the heat reactive material onto thermally stable convective barrier and then adhering the 7 g/m² polyethylene microporous meltable film layer to the thermally stable convective barrier using a nip pressure of about 30 psi. The discrete dots of heat reactive material were printed by a gravure roller (at about 100° C. with a pressure of about 40 psi) in such a manner to provide coverage of approximately 32 percent on the surface of the meltable layer, with a laydown of about 65-70 g/m².

A flame resistant composite article was made by laminating a 65.7 g/m² nylon 6,6 woven twill facial layer from Milliken & Company, Spartanburg, S.C., USA with a thickness of 160 μm to the meltable layer of the intermediate laminate. The composite article was constructed by printing standard lamination adhesive in a discontinuous manner and with a laydown of 10 g/m² onto the meltable layer and then adhering the facial layer to the meltable layer.

The final composite product was obtained after applying a durable water repellant (DWR) coating to the outside of the facial layer.

Example 4

An intermediate laminate was made using a 7 g/m² polyethylene microporous meltable film layer with a thickness of 15 μm from LinYi Gelon LIB Co., Ltd., LinYi City, ShanDong, China and a thermally stable convective barrier, as described above, as inner layer. The intermediate laminate was constructed by printing discrete dots of the heat reactive material onto thermally stable convective barrier and then adhering the 7 g/m² polyethylene microporous meltable film layer to the thermally stable convective barrier using a nip pressure of about 30 psi. The discrete dots of heat reactive material were printed by a gravure roller (at about 100° C. with a pressure of about 40 psi) in such a manner to provide coverage of approximately 32 percent on the surface of the meltable layer, with a laydown of about 65-70 g/m².

A flame resistant composite article was made by laminating a 124.8 g/m² nylon 6,6 woven twill facial layer from Asahi Kasei Advance Corporation Minato-Ku, Tokyo, Japan with a thickness of 260 μm to the meltable layer of the intermediate laminate. The composite article was constructed by printing standard lamination adhesive in a discontinuous manner and with a laydown of 10 g/m² onto the meltable layer and then adhering the facial layer to the meltable layer.

The final composite product was obtained after applying a durable water repellant (DWR) coating to the outside of the facial layer.

Examples 5

An intermediate laminate was made using a 33 g/m² nylon 6,6 tricot knit meltable layer with a thickness of 180 μm from Asahi Kasei Advance Corporation, Minato-Ku, Japan and a thermally stable convective barrier, as described above, as inner layer. The intermediate laminate was constructed by printing discrete dots of the heat reactive material onto thermally stable convective barrier and then adhering the 33 g/m² nylon 6,6 tricot knit meltable layer to the thermally stable convective barrier using a nip pressure of about 30 psi. The discrete dots of heat reactive material were printed by a gravure roller (at about 100° C. with a pressure of about 40 psi) in such a manner to provide coverage of approximately 32 percent on the surface of the meltable layer, with a laydown of about 65-70 g/m².

A flame resistant composite article was made by laminating a 65.7 g/m² nylon 6,6 woven twill facial layer from Milliken Corporation, Spartanburg, S.C., USA with a thickness of 160 μm to the meltable layer of the intermediate laminate. The composite article was constructed by printing standard lamination adhesive in a discontinuous manner and with a laydown of 10 g/m² onto the meltable layer and then adhering the facial layer to the meltable layer.

The final composite product was obtained after applying a durable water repellant (DWR) coating to the outside of the facial layer.

Example 6

An intermediate laminate was made using a 33 g/m² nylon 6,6 tricot knit meltable layer with a thickness of 180 μm from Asahi Kasei Advance Corporation, Minato-Ku, Japan and a thermally stable convective barrier, as described above, as inner layer. The intermediate laminate was constructed by printing discrete dots of the heat reactive material onto thermally stable convective barrier and then adhering the 33 g/m² polyamide tricot knit meltable layer to the thermally stable convective barrier using a nip pressure of about 30 psi. The discrete dots of heat reactive material were printed by a gravure roller (at about 100° C. with a pressure of about 40 psi) in such a manner to provide coverage of approximately 32 percent on the surface of the meltable layer, with a laydown of about 65-70 g/m².

A flame resistant composite article was made by laminating a 124.8 g/m² nylon 6,6 woven twill facial layer from Asahi Kasei Advance Corporation, Minato-Ku, Tokyo, Japan with a thickness of 260 μm to the meltable layer of the intermediate laminate. The composite article was constructed by printing standard lamination adhesive in a discontinuous manner and with a laydown of 10 g/m² onto the meltable layer and then adhering the facial layer to the meltable layer.

The final composite product was obtained after applying a durable water repellant (DWR) coating to the outside of the facial layer.

Comparative Example 2

An intermediate laminate was made using a 38.5 g/m² nylon 6,6 woven ripstop meltable layer with a thickness of 80 μm from Asahi Kasei Advance Corporation, Minato-Ku, Tokyo, Japan and a thermally stable convective barrier as described above. The intermediate laminate was constructed by printing discrete dots of the heat reactive material onto thermally stable convective barrier and then adhering the 38.5 g/m² nylon 6,6 woven ripstop meltable layer to the thermally stable convective barrier using a nip pressure of about 30 psi. The discrete dots of heat reactive material were printed by a gravure roller (at about 100° C. with a pressure of about 40 psi) in such a manner to provide coverage of approximately 32 percent on the surface of the meltable layer, with a laydown of about 65-70 g/m².

The final composite product was obtained after applying a durable water repellant (DWR) coating to the outside of the facial layer.

Comparative Example 3

An intermediate laminate was made using a 65.7 g/m² nylon 6,6 woven twill meltable layer with a thickness of 160 μm from Milliken & Company, Spartanburg, S.C., USA and a thermally stable convective barrier as described above. The intermediate laminate was constructed by printing discrete dots of the heat reactive material onto thermally stable convective barrier and then adhering the 65.7 g/m² nylon 6,6 woven twill meltable layer to the thermally stable convective barrier using a nip pressure of about 30 psi. The discrete dots of heat reactive material were printed by a gravure roller (at about 100° C. with a pressure of about 40 psi) in such a manner to provide coverage of approximately 32 percent on the surface of the meltable layer, with a laydown of about 65-70 g/m².

The final composite product was obtained after applying a durable water repellant (DWR) coating to the outside of the facial layer.

Comparative Example 4

An intermediate laminate was made using a 124.8 g/m² nylon 6,6 woven twill meltable layer with a thickness of 260 μm from Asahi Kasei Advance Corporation, Minato-Ku, Tokyo, Japan and a thermally stable convective barrier as described above. The intermediate laminate was constructed by printing discrete dots of the heat reactive material onto thermally stable convective barrier and then adhering the 124.8 g/m² nylon 6,6 woven twill meltable layer to the thermally stable convective barrier using a nip pressure of about 30 psi. The discrete dots of heat reactive material were printed by a gravure roller (at about 100° C. with a pressure of about 40 psi) in such a manner to provide coverage of approximately 32 percent on the surface of the meltable layer, with a laydown of about 65-70 g/m².

The final composite product was obtained after applying a durable water repellant (DWR) coating to the outside of the facial layer.

Results

TABLE 1

| Example | Laminate Weight (grams/meter²) | Face textile/ color (type/ denier/color) | TPP value (cal/cm²) | Flammability Test* Burned Area (cm²), 1 minute exposure | Burned area (cm²), 3 second exposure |
|---|---|---|---|---|---|
| 1 | 188.3 | Lightweight | 22.7 | 16.5 | 4.5 |
| 2 | 158.2 | 30d nylon/ | 19.5 | 23.5 | 4.6 |
| Comparative 2 | 138.8 | light green | 18.0 | 12.6 | 6.2 |
| 3 | 186.4 | Middle | 23.8 | 33.8 | 3.4 |
| 5 | 213.7 | weight 70d/ | 24.8 | 39.3 | 3.4 |
| Comparative 3 | 176.5 | dark green | 20.8 | 17.4 | 4.3 |
| 4 | 252.3 | Heavy | 25.8 | 32.8 | 2.4 |
| 6 | 274.8 | weight 70d/ | 28.9 | 45.5 | 2.2 |
| Comparative 4 | 236.6 | khaki | 24.7 | 48.2 | 3.1 |

*All test samples showed afterflame and afterglow in both the 1 minute exposure and 3 second after ignition tests as 0 seconds.

The thermal protective performance of Examples 1-6 and Comparative Examples 2-4 were measured according to the procedures described above. Numerical data for Flammability, Thermal protective performance (TPP) and area weight are summarized in Table 1. Examples 1-6 showed comparable thermal performance versus laminate weight to Comparative Examples 2-4.

The flammability test results for Example 1-6 and Comparative Example 2-4 in accordance with JIS L 1091 A1 are also shown in Table 1. The laminate sample of Example 1-6 and Comparative Example 2-4 showed excellent after flame time and afterglow time. Example 1, 2 and Comparative example 2 showed excellent anti-flammability. When compared to Examples 3 and 5, Comparative example 3 showed slightly better anti-flammability. When compared to examples 4 and 6, Comparative example 4, Example 4 showed better anti-flammability.

TABLE 2

| Example | Face textile/ color (type/ denier/color) | Color Difference | Visual Appearance | MVTR (grams/ $m^2$/day) |
|---|---|---|---|---|
| 1 | Lightweight | 18.39 | 2 | 6,100 |
| 2 | 30d nylon/ | 30.98 | 1 | 1,000 |
| Comparative 2 | light green | 35.34 | 5 | 3,800 |
| 3 | Middle weight | 0.77 | 1 | 1,400 |
| 5 | 70d/dark | 1.53 | 2 | 6,800 |
| Comparative 3 | green | 2.77 | 4 | 5,300 |
| 4 | Heavy weight | 0.47 | 1 | 1,300 |
| 6 | 70d/khaki | 0.69 | 2 | 7,200 |
| Comparative 4 | | 0.73 | 3 | 6,600 |

The color difference between the original textiles (that is, the unlaminated facial layers) and the facial layers in the composite article was measured according to the procedure described above. Results were summarized in Table 2. Examples 1-6 showed smaller color difference than Comparative Examples for each color of the unlaminated facial layers. Comparable Examples 2-4 showed more obvious printed pattern of the heat reactive adhesive than Example 1-6 from the view of face textile.

Surface appearance defined by the Visual Appearance Test, described above, are provided for Examples 1-6 and Comparative Examples 2-4. Each of Examples 1-6 showed better surface appearance in terms of surface flatness than the Comparative Examples which showed dimple like surface unevenness.

The measurement results of Moisture Vapor Transmission Rate (MVTR) of Examples 1-6 and Comparative Examples 2-4 were summarized in Table 2. Example 2, 3 and 4 showed lower MVTR than Comparative Examples 2, 3 and 4 for each face textiles, but those examples still have acceptable breathability for moisture vapor. Example 1, 5 and 6 showed higher MVTR than Comparable Examples 2-4.

In addition, on visual inspection, the heat reactive adhesive heavily printed through the surface of Comparative Examples 2 and 3, but the print though was only very slight for examples 1-6 and Comparative Example 4.

TABLE 3

| Example | Laminate Weight, grams/meter$^2$ | Tear Strength (machine direction/transverse direction), Newtons |
|---|---|---|
| 1 | 188.3 | 18.0/12.4 |
| Comparative Example 1 | 111.7 | 9.8/6.8 |

Weight and Tear strength were measured according to the procedure describe above for the composite articles of Example 1 and Comparative Example 1. The results are shown in table 3. The laminate sample of Comparative Example 1 was lighter than the laminate sample of Example 1, however the tear strength was very low because of the weakness of tricot knit textile as face material.

Examples 7-12

An ePTFE film was produced in accordance with the teachings of U.S. Pat. No. 6,074,738. The ePTFE film was used as the thermally stable convective barrier in the following examples.

The meltable layers of Table 3 were laminated to the thermally stable convective layer as inner layer using the heat reactive material adhesive to form the composite articles. Four samples of each composite was then exposed to a 30 second flame using the horizontal flame test apparatus and were examined for afterflame. The results can be found in Table 4.

TABLE 4

| Example | Meltable layers | Afterflame results |
|---|---|---|
| 7 | Metallized MYLAR ® film (32.4 g/m$^2$, thickness 25.4 μm) | 0 seconds, 2 samples showed dripping, 2 samples did not |
| 8 | CEREX ® Type 23070 spunbond polyamide 6.6 (available from Cerex Advanced Fabrics, Inc., Cantoment, Florida) | 0 seconds, samples were curled, 2 samples had edges on fire, but the flame did not persist when the flame was removed |
| 9 | PVC film #8VP-3625, available from Warp Bros, Chicago, Illinois | 9 seconds for 1 sample, 0 seconds for other samples |
| 10 | KAPTON ® polyimide film, Available from DuPont, Wilmington, DE (72.5 g/m$^2$, 53 μm) | 0 seconds |
| 11 | Polyolefin film | 0 seconds |
| 12 | Polyethylene film, available from Castle Bag Co., as Blue tint slip single wound sheeting | 0 seconds |

The invention claimed is:

1. A flame resistant composite article comprising:
   a. a facial layer;
   b. a meltable layer contacting the facial layer;
      wherein the meltable layer is a polyamide, a nylon, a nylon 6, a nylon 6.6, a polyester, a polyethylene terephthalate, a polytrimethylene terephthalate, a polyurethane, a polyolefin, a polyethylene, a polypropylene, a polyamide tricot knit, a EVOH, a EVAc, a PVC, a PVdC, a polyvinyl fluoride, a polyvinylidene fluoride, a fluoropolymer, a polyether, a polyacrylate, a polymethacrylate, a copolyetherester, a copolymer, a microporous polyolefin, a microporous polyester, a microporous polyurethane, or a multilayer laminate thereof;
   c. a heat reactive material contacting the meltable layer so as to sandwich the meltable layer between the heat reactive material and the facial layer, wherein the heat reactive material comprises a polymer resin and an expandable graphite; and d. an inner layer contacting the heat reactive material so as to sandwich the heat reactive material between the inner layer and the meltable layer;
   wherein, upon exposure of the flame resistant composite article to a temperature greater than or equal to 280° C., a melt of the meltable layer absorbs into the heat reactive material, and the heat reactive material expands to form a char comprised of the meltable layer and the heat reactive material.

2. The flame resistant composite article of claim 1, wherein the meltable layer is a textile and the textile is a woven, a knit, a tricot knit, a non-woven material, a multilayer nonwoven material or combinations thereof.

3. The flame resistant composite article of claim 1, wherein the meltable layer is a meltable film, wherein the meltable film is non-porous or microporous.

4. The flame resistant composite article of claim 3, wherein the meltable film is a single layer film or a multilayer film.

5. The flame resistant composite article of claim 3, wherein the meltable film is a microporous polyolefin, a microporous polyester, or a microporous polyurethane.

6. The flame resistant composite article of claim 3, wherein the meltable film is a polyethylene, a polypropylene, a EVOH, a EVAc, a PVC, a PVdC, a polyvinyl fluoride, a polyvinylidene fluoride, a fluoropolymer, a polyurethane, a polyester, a polyamide, a polyether, a polyacrylate and a polymethacrylate, a copolyetherester, and a copolymer or a multilayer laminate thereof.

7. The flame resistant composite article of claim 1, wherein the facial layer is a textile and wherein the textile is a woven, a knit, a tricot knit, a non-woven material, a multilayer non-woven material or a combination thereof.

8. The flame resistant composite article of claim 1, wherein the facial layer is a polyamide, a polyester, a polypropylene, a polyethylene or multilayer laminates thereof.

9. The flame resistant composite article of claim 1, wherein the meltable layer has a weight of less than 50 grams per square meter.

10. The flame resistant composite article of claim 1, wherein the polymer resin is a polyurethane.

11. The flame resistant composite article of claim 1, wherein the inner layer is a convective barrier.

12. The flame resistant composite article of claim 1, wherein the inner layer is expanded polytetrafluroethylene (PTFE).

13. The flame resistant composite article of claim 1, wherein the facial layer is meltable.

14. A garment comprising the flame resistant composite article of claim 1, wherein the facial layer is oriented away from the body of a wearer.

15. A method for producing a flame resistant composite article comprising:
a. providing a meltable layer having an inner side and an outer side,
   wherein the meltable layer is a polyamide, a nylon, a nylon 6, a nylon 6.6, a polyester, a polyethylene terephthalate, a polytrimethylene terephthalate, a polyurethane, a polyolefin, a polyethylene, a polypropylene, a polyamide tricot knit, a EVOH, a EVAc, a PVC, a PVdC, a polyvinyl fluoride, a polyvinylidene fluoride, a fluoropolymer, a polyether, a polyacrylate, a polymethacrylate, a copolyetherester, a copolymer, a microporous polyolefin, a microporous polyester, a microporous polyurethane, or a multilayer laminate thereof;
b. providing a heat reactive material comprising a polymer resin and an expandable graphite;
c. providing an inner layer;
d. applying the heat reactive material to the inner side of the meltable layer so as to position the heat reactive material between the meltable layer and the inner layer;
e. providing a facial layer; and
f. attaching the facial layer to the outer side of the meltable layer such that the facial layer contacts the outer side of the meltable layer,
   wherein, upon exposure of the flame resistant composite article to a temperature greater than or equal to 280° C., a melt of the meltable layer absorbs into the heat reactive material, and the heat reactive material expands to form a char comprised of the meltable layer and the heat reactive material.

16. The method of claim 15, further comprising the step of applying a durable water resistant (DWR) coating to the facial layer.

17. The method of claim 15, wherein the polymer resin-expandable graphite material is applied between the meltable layer and the inner layer continuously or discontinuously.

18. The method of claim 15, wherein the polymer resin-expandable graphite material is applied between the meltable layer and the inner layer as discontinuous dots, lines, or grids, or combinations thereof.

* * * * *